United States Patent
Duesterhoeft et al.

(10) Patent No.: US 6,265,670 B1
(45) Date of Patent: Jul. 24, 2001

(54) GROMMET FOR PLURALITY OF CABLE EXITS OF AN ENCLOSURE

(75) Inventors: Scott Stephen Duesterhoeft, Etters; James William Robertson, Oberlin; Francis Joseph Shay, Palmyra, all of PA (US)

(73) Assignee: The Whitaker Corporation, Wilmington, DE (US)

( * ) Notice: Subject to any disclaimer, the term of this patent is extended or adjusted under 35 U.S.C. 154(b) by 0 days.

(21) Appl. No.: 08/032,889

(22) Filed: Mar. 18, 1993

(51) Int. Cl.[7] .................................................. H01B 17/26
(52) U.S. Cl. ..................... 174/152 G; 174/156; 174/157; 174/167; 174/65 G; 174/65 R
(58) Field of Search ................................ 174/65 R, 65 G, 174/153 G, 152 G, 135, 151, 153 R, 156, 157, 167; 361/826, 675; 439/587, 460, 719, 519, 521, 271, 272, 273, 204, 279

(56) References Cited

U.S. PATENT DOCUMENTS

| | | |
|---|---|---|
| 3,003,084 | * 10/1961 | Wilkinson .............................. 16/2 X |
| 4,236,778 | * 12/1980 | Hughes et al. ..................... 439/460 X |
| 4,488,008 | 12/1984 | Dellinger et al. ................... 179/81 R |
| 4,575,169 | 3/1986 | Duplatre et al. ................... 339/44 M |
| 4,624,514 | 11/1986 | Smith .................................. 379/412 |
| 4,908,482 | * 3/1990 | Shimirak et al. ................ 174/65 G X |
| 4,945,560 | 7/1990 | Collins et al. ....................... 379/399 |
| 5,006,077 | 4/1991 | Loose et al. .......................... 439/409 |
| 5,101,079 | * 3/1992 | Rodrigues et al. ................. 174/65 R |
| 5,145,388 | 9/1992 | Brownlie et al. .................... 439/142 |
| 5,146,650 | 9/1992 | Robertson ............................ 16/259 |
| 5,219,302 | 6/1993 | Robertson et al. .................. 439/404 |
| 5,254,808 | 10/1993 | Rodrigues et al. ................ 174/65 R |
| 5,296,646 | * 3/1994 | Capper et al. .......................... 174/51 |
| 5,323,454 | * 6/1994 | Shay et al. ......................... 174/59 X |

OTHER PUBLICATIONS

AMP Catalog No. 82257, "AMP Quiet Front Terminal Block", 6 pages, Sep., 1991; AMP Incorporated, Harrisburg, PA.
U.S. application No. 07/710,310.
U.S. application No. 07/839,970.
U.S. application No. 07/863,626.
U.S. application No. 07/880,449.

* cited by examiner

Primary Examiner—Albert W. Paladini

(57) ABSTRACT

A grommet (150) is securable to and along an edge (46) of a wall (36) of an enclosure (10) to provide sealing about lengths of cable extending through recesses (48) along the edge (46). Grommet (150) includes a cable-receiving section (152) having a diaphragm (168) traversing each of the recesses and includes a virtual slit (156) extending from a thick top edge portion (154) and through the diaphragm to the thick bottom edge portion (158). A cable (22) is insertable into the virtual slit (156) until seated in and through the diaphragm; stiff opposed portions (176) of the top edge (154) of the grommet close after being deflected temporarily as the cable is urged therepast; thin resilient opposed strips (170) of the diaphragm (168) similarly close upon said cable being urged therepast, while strips (170) adjacent the cable remain deflected by and biased against the cable. Upstanding wall sections (50,52) of the enclosure wall (36) are received through apertures (164) through the grommet and latch therewith.

9 Claims, 6 Drawing Sheets

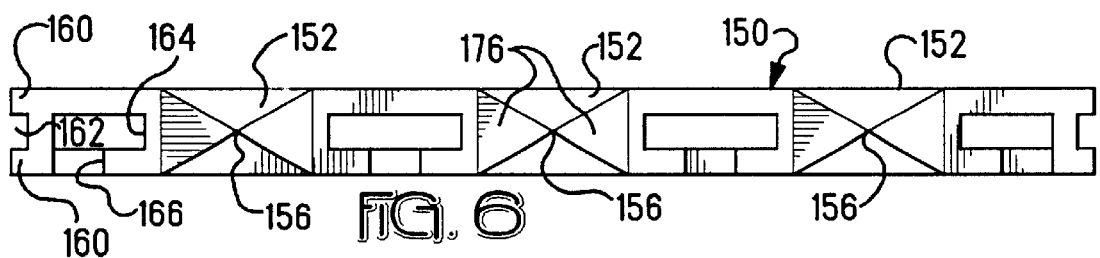
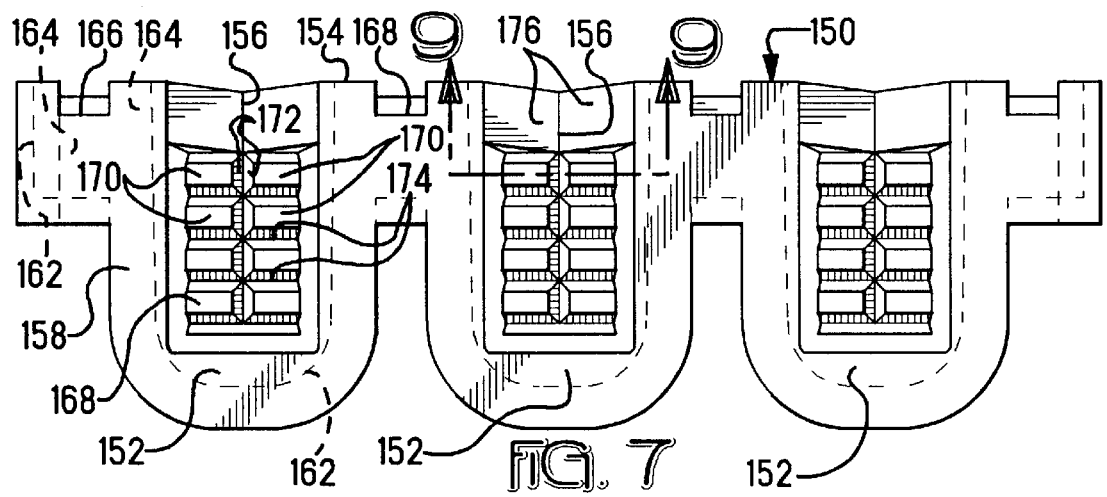
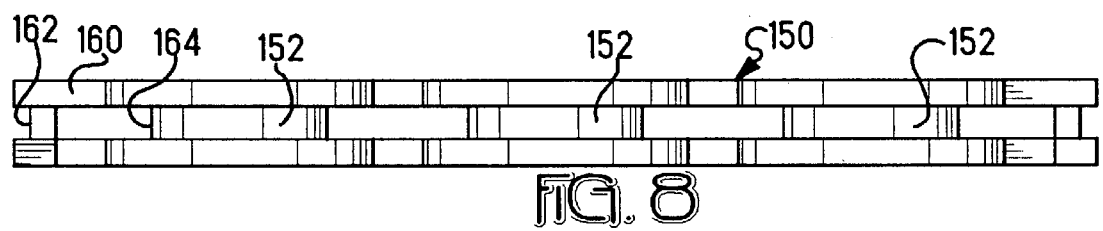
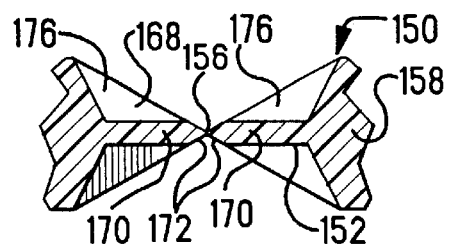

GROMMET FOR PLURALITY OF CABLE EXITS OF AN ENCLOSURE

FIELD OF THE INVENTION

The present invention is directed to the field of enclosures for electrical connectors and more particularly to grommets for use with enclosures for terminal blocks for interconnecting service and distribution cables of telephone wires.

BACKGROUND OF THE INVENTION

In the telecommunications industry telephone distribution cable is introduced to individual telephone sites such as residences, mainly through use of a splice of pairs of tip and ring signal wires of the cable to tip and ring wires of a respective service cable at a junction located outside the house. The junction is housed within a protective enclosure which is mounted usually to an outside wall of the house.

A variety of enclosures are known, mountable to poles or walls, within which are mounted one or more terminal blocks used to interconnect tip and ring wires of distribution cable and a plurality of service cables, including a rugged enclosure such as disclosed in U.S. The enclosure includes arrays of openings along both side edges of the rear wall and to each side of the array of terminal blocks, and also through the bottom wall, through which extend respective service cables. Sealing about the openings around the cables is provided by a pair of elongate strips traversing the array of openings, held in place by the structure of the enclosure. A first strip adjacent the rear wall includes discrete slits aligned with the wall's openings, and a second strip outwardly of and adjacent the first strip includes small diameter holes punched therethrough aligned with the centers of the cable openings, all permitting insertion therethrough of cable ends and sealing therearound, and also closing off any particular opening into which no cable is inserted.

Other such enclosures are disclosed in U.S. patent applications Ser. No. 098/032,890 and Ser. No. 08/085,129; both filed Mar. 18, 1993; assigned to the assignee hereof; the enclosures similarly contain terminal blocks mountable therein each interconnecting conductors of a distribution cable and an array of service wires, or two arrays of service wires, and which are easily openable to stable positions permitting access thereinto.

It is desired to provide a grommet for a telephone line enclosure having a plurality of cable exits which provides for environmental sealing about the cables extending through the respective cable exits.

It is also desired to provide such a grommet that seals about each of a plurality of such cables and closes off unused ones of the cable exits, and is replaceable.

SUMMARY OF THE INVENTION

The present invention is a grommet for an enclosure in which are mountable interconnection or crossconnection modules, and into which extend ends of a plurality of service cables for the tip and ring conductors thereof to be connected to a distribution cable or crossconnected to each other. An array of recesses define individual service cable exits and are provided along the forward edge of the front wall of the box, with edge grommet members secured along the forward edge providing sealing about the respective cables and closing off unused exits.

The edge grommet is molded of elastomeric material and includes sections associated with the cable-receiving recesses of the enclosure which coextend from a top edge which will extend along the forward edge of the front wall of the enclosure, as the sections are disposed within respective ones of the cable-receiving recesses. Each section includes a vertical virtual slit from and through the thick top edge to the thick bottom edge and which is openable as a cable is moved laterally into the section from the top edge, and which is somewhat stiffly elastic to grip the cable and close off the recess about the cable. The edge grommet is so formed that the portion adjacent the edge surfaces of the enclosure comprising the forward edge of the front wall and also the side and bottom edges of each cable-receiving recess is thick and sturdy, and the thickness is reduced between the thick top and bottom edge portions in each cable-receiving section extending from opposing sides to the slit to define a diaphragm. The thick contoured edge includes outer and inner lips or flanges defining a channel into which the edge surfaces of the enclosure wall are received to provide a sealed interface.

Preferably the edge grommet is mechanically securable to the enclosure front wall. The front wall includes a plurality of upstanding wall sections of limited width between the cable-receiving recesses and also beside the outer recesses, which are receivable into close fitting apertures through the thick contoured edge of the edge grommet. Latching projections are formed on the upstanding wall sections adjacent the forward edge of the front wall, which latchingly engage corresponding latching recesses of the edge grommet at trailing ends of the close fitting apertures after the edge grommet has been fully inserted onto the front wall. This arrangement permits removal and replacement of an edge grommet if desired.

It is an objective of the present invention to provide an enclosure adapted to permit mounting in the interior thereof of terminal blocks and modules useful in interconnecting service cables to a distribution cable of a telephone line, and which environmentally seals the interior.

It is additionally an objective to provide a grommet member for sealing a plurality of cable-receiving entrances into an enclosure for an array of service cables.

It is further an objective to provide a grommet member which is easily assembled to the enclosure and which is removable and replaceable.

An embodiment of the invention will now be described by way of example with reference to the accompanying drawings.

BRIEF DESCRIPTION OF THE DRAWINGS

FIGS. 5 to 9 are isometric, plan, elevation and bottom views and an enlarged cross-sectional view of a virtual cable-receiving slit of a section thereof respectively, of an edge grommet of the present invention, with FIG. 5 illustrating assembly of the edge grommet with the enclosure.

DETAILED DESCRIPTION OF THE PREFERRED EMBODIMENTS

Figure 1:
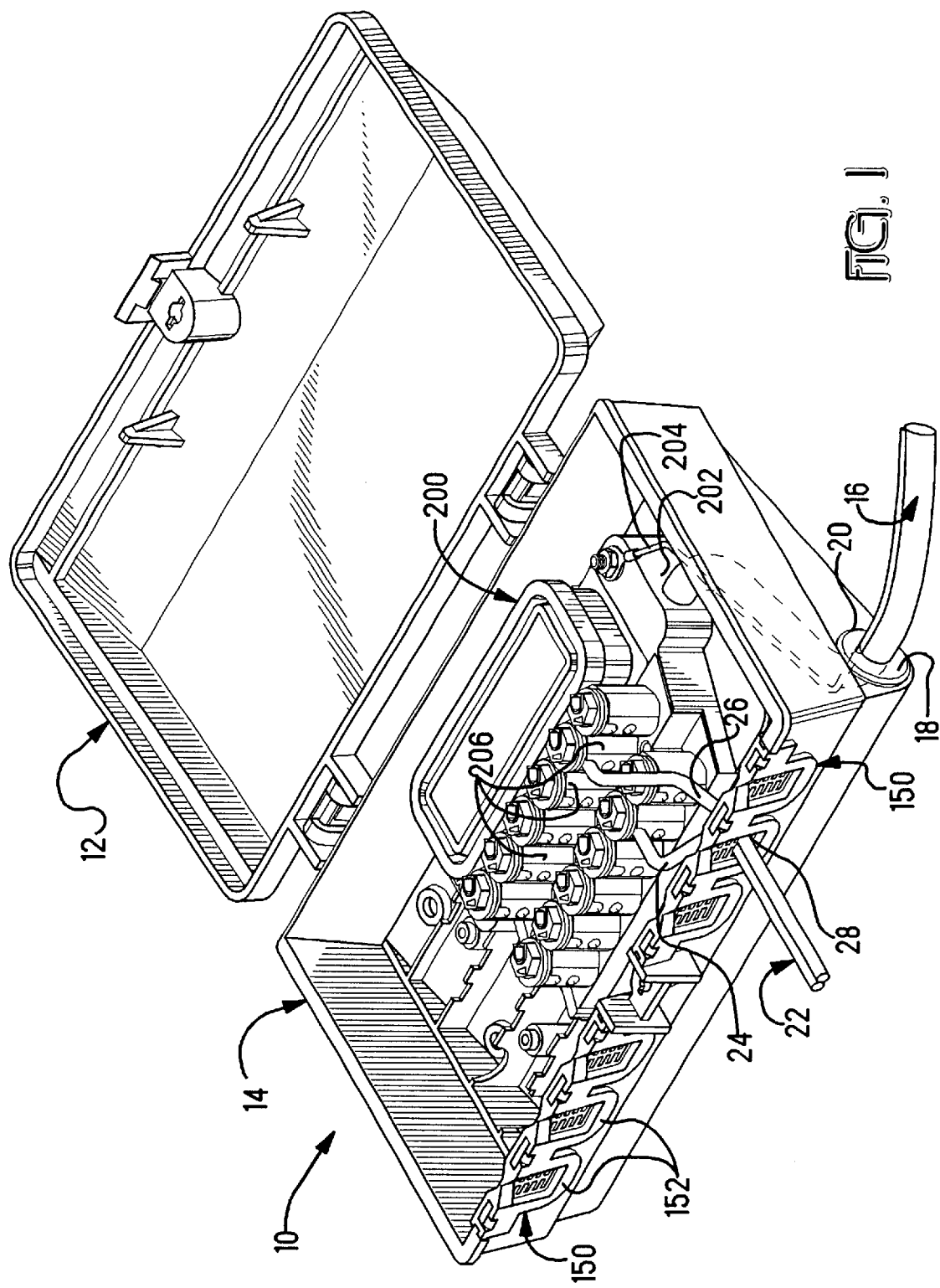
FIG. 1 is an isometric view of an enclosure having secured thereon an edge grommet of the present invention, with the enclosure lid in an open position exposing a protected module mounted therewithin having conductors of a representative service cable connected to conductors of a distribution cable within respective housing sections of the module.

In FIG. 1 enclosure 10 is shown with lid 12 in an open position exposing the interior of box section 14 having a protected module 200 mounted therein. Enclosure 10 is of the type disclosed in U.S. patent application Ser. No. 08/035, 129 filed Mar. 18, 1993. Distribution cable 16 is shown extending into enclosure 10 at cable entry 18 through grommet 20. A representative service cable 22 having tip and ring conductor wires 24,26 is shown extending into enclosure 10 at a cable entry 28; wires 24,26 are interconnected with respective conductors (not shown) of distribution cable 16. Cable entry 28 is sealed about service cable 22 by portions of edge grommet 150 at a cable entry section 152 thereof.

Protected module 200 is of the type disclosed in U.S. Pat. No. 5,296,646. Distribution cable 16 is shown entering the protector housing portion 202 where its array of conductors are electrically connected in-line with protector devices (not shown) which protect the circuits against voltage surges. A ground circuit 204 is shown extending from protector housing portion and is electrically connected to a ground post in a forward portion of enclosure 10 for connection to an external ground (not shown) as is conventional. Conductors (not shown) extend from the protector devices to respective terminals within individual housing sections 206 into which have been inserted respective ones of the tip and ring wires of the service cables for electrical connection thereto, as is disclosed in U.S. Pat. No. 5,296,646.

Lid 12 is fastened to box section 14 in a manner similar to that of U.S. Pat. Nos. 5,145,388 and 5,146,650, which permits pivoting between closed and open positions. The fastening arrangement enables the lid to remain in an open position without assistance overcoming gravity and wind depending on the physical location and on the particular orientation in which the enclosure is mounted upon installation, thus facilitating electrical connection of the array of service cables and also repair and servicing thereof and of protector devices and terminals in module 200 after installation in the field. The durable fastening arrangement also utilizes no separate fastening elements and is easily moldable integrally with the box section 14 an the lid 12.

Figure 2:
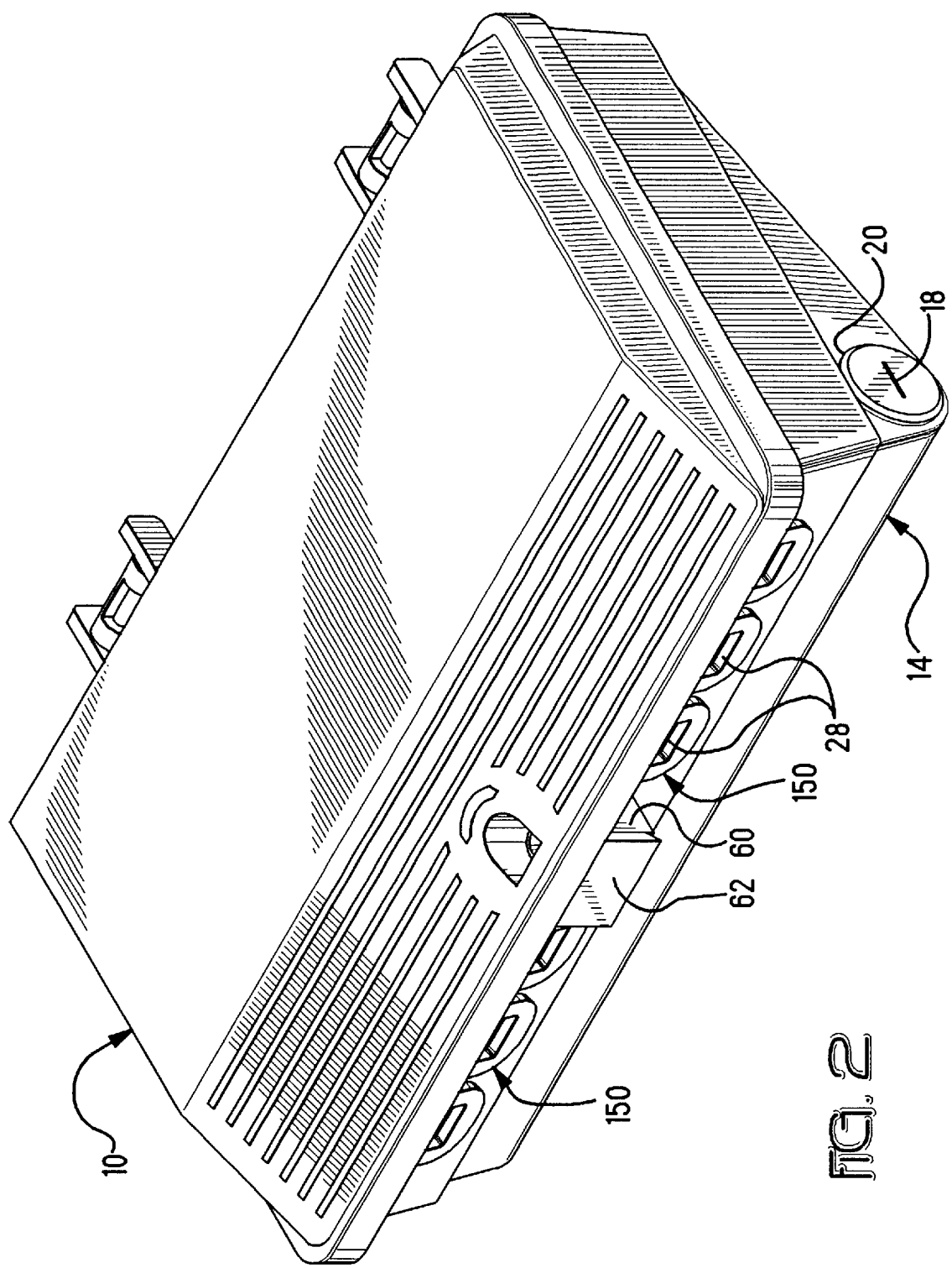
FIG. 2 is an isometric view of the enclosure with the lid in a closed position.

FIG. 2 illustrates an enclosure 10 with lid 12 in a closed position, having been pivoted forwardly and latched whereafter a security fastener (not shown) disposal in aperture 30 is actuatable by special tools by authorized personnel of the telephone company, to lock the lid in its closed position, all as is conventional. Latching and locking sections 60 of box section 14 and 62 of lid 12 are seen in greater detail in FIG. 3. Grommet 20 is seen at cable entry 18 having a virtual slit therein which will seal about a distribution cable upon installation in the enclosure, if required in the particular use to which the enclosure is put, and which otherwise remains sealed if no such distribution cable is to be used.

Figure 3:
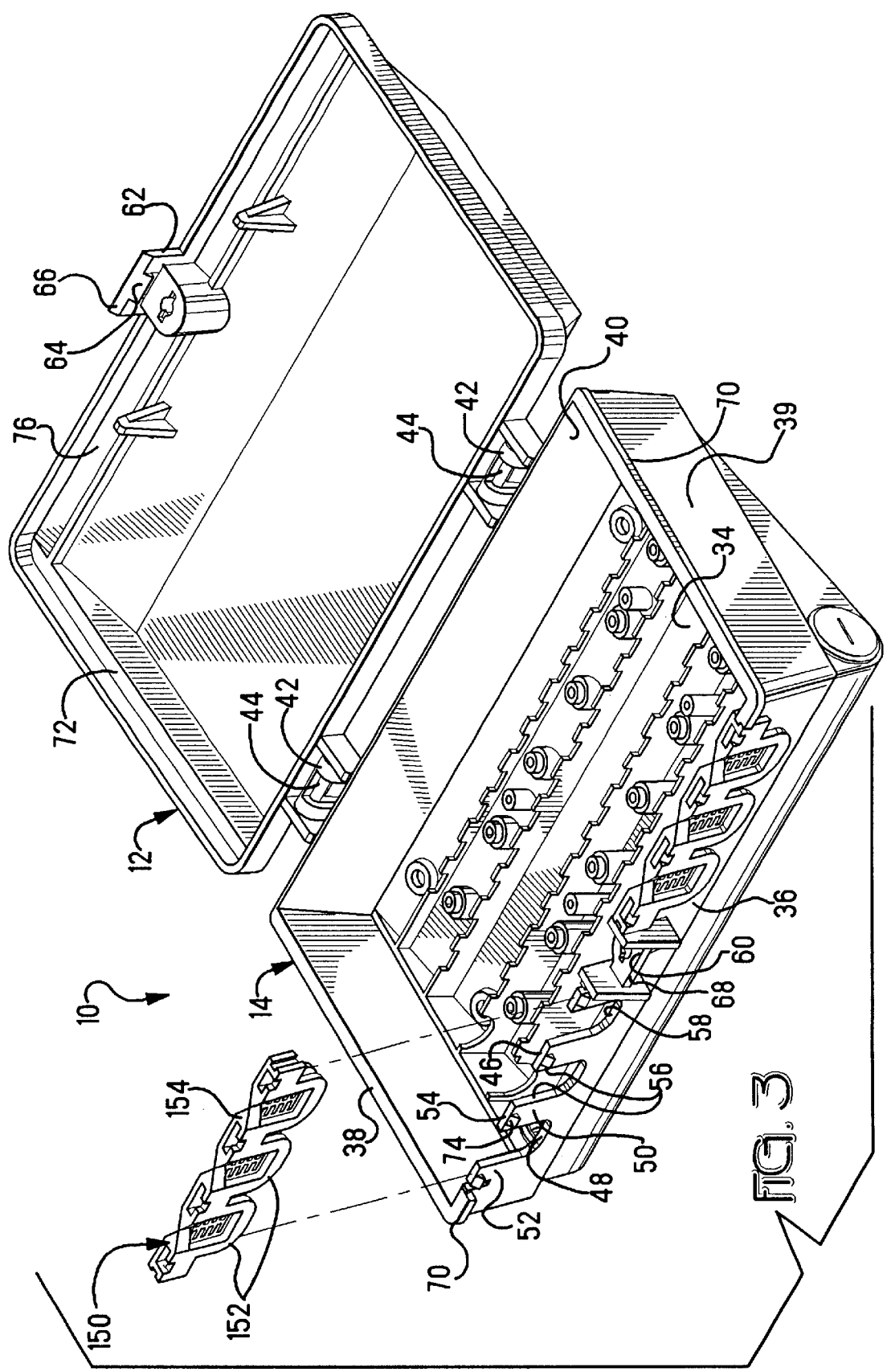
FIG. 3 is an isometric view of the enclosure of FIG. 1 with no module mounted therein, showing one of the edge grommets of the present invention exploded from the front wall thereof.
Figure 4:
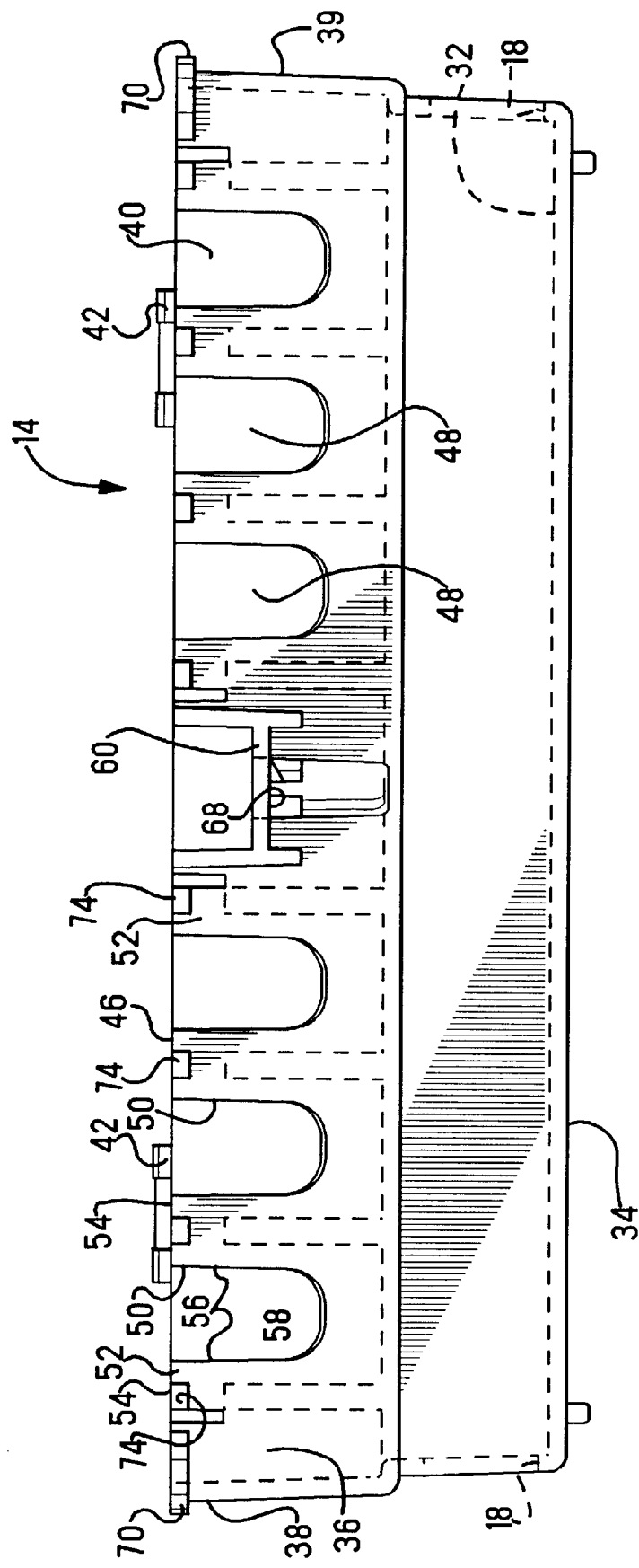
FIG. 4 is an elevation view of the enclosure with the edge grommets removed from the front wall thereof and showing cable-receiving recesses therethrough.

In FIGS. 3 and 4, enclosure 10 is shown in greater particularity, again with lid 12 in its open position exposing the interior, with no modules mounted therein nor cables shown. An edge grommet 150 of the present invention is seen exploded from box section 14. Box section 14 includes a bottom wall 34, front wall 36 side walls 38,39 and rear wall 40. A distribution cable region 32 is defined adjacent front wall 36 extending between opposed cable entries 18 through side walls 38,39. Rear wall 40 includes integral hook-shaped projections 42 within which are pivotally movably held dowels 44 of lid 12.

Front wall 36 includes a forward edge 46 having recesses 48 extending into front wall 36 from forward edge 46 for eventual receipt therethrough of service cables. Upstanding wall sections 50 along with upstanding wall sections 52 to each side of the arrays of recesses 48, separate and define recesses 48, all extending to leading ends 54, and having opposed edge surfaces 56 defining parallel sides of recesses 48 which conclude in arcuate recess bottom edges 58. Arrays of recesses 48 are disposed to either side of latching and locking section 60 centrally located along front wall 36 cooperable with the complementary latching and locking arrangement 62 of lid 12. Latching may be by means of an inwardly directed latching projection 64 along the inner surface of tab 66 which latches beneath ledge 68 extending forwardly from front wall 36, upon lid closing. Outwardly directed lips 70 extend from top edges of side walls 38,39 and becomes seated within corresponding recesses 72 of lid 12 upon closing thereof.

Figure 5:
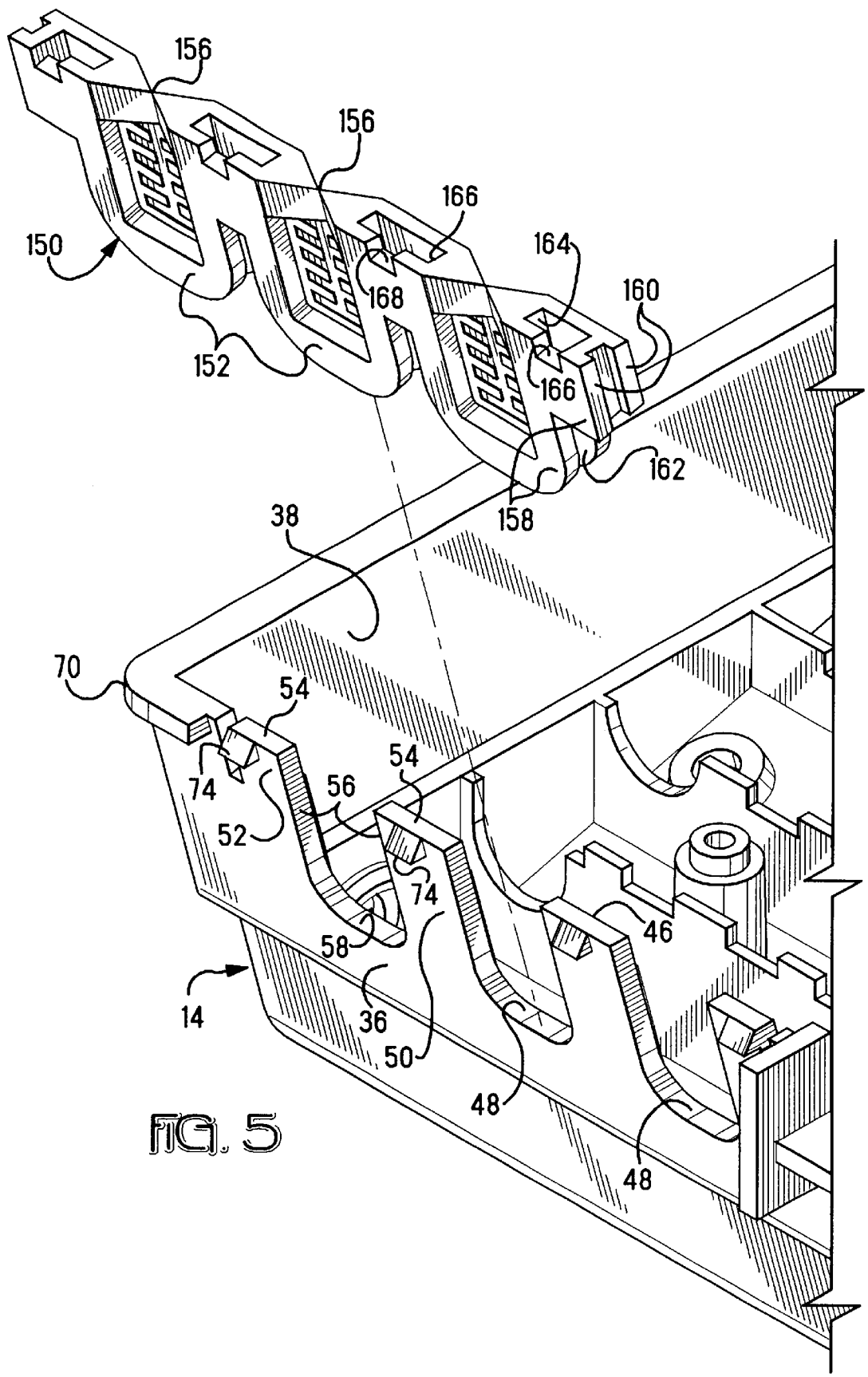

Referring to FIGS. 3 to 5, edge grommets 150 are associated with each array of recesses 48 with cable-receiving sections 152 associated with respective recesses 48. Edge grommets 150 are mountable to forward edge 46 such as by means of latching projections 74 adjacent leading ends 54 of upstanding wall sections 50,52 of front wall 36 cooperable with latching recesses formed in edge grommets 150. The coplanar, virtually continuous upper surface 154 of edge grommet 150 engages and is compressible against an opposing ledge surface 76 of lid 12 upon closing, effectively forming an environmental seal.

Referring now to FIGS. 5 to 9, an edge grommet 150 is molded of elastomeric material such as of SARLINK 1360 elastomer/PVC alloy, oil resistant thermoplastic elastomer sold by DSM Thermoplastic Elastomers, Inc. Leominster, Mass. Edge grommet 150 includes sections 152 associated with the cable-receiving recesses 48 of the enclosure which coextend from upper surface 154 which will extend along the forward edge 46 of front wall 36 of box section 14 as sections 152 are disposed within respective ones of cable-receiving recesses 48. Each section 152 includes a virtual slit 156 openable as a cable is moved laterally into the section from upper surface 154, and which is somewhat stiffly elastic to grip the cable and close off the recess about the cable. The edge grommet includes bottom edge portion 158 which upon assembly onto front wall 36 will be adjacent the edge surfaces thereof comprising top edge surfaces 54 of wall sections 50,52 of front wall 36 and also opposed edge surfaces 56 and bottom edges 58 of each cable-receiving recess 48. Bottom edge portion 158 is thick and sturdy, and the thickness is reduced inwardly thereof at each respective cable-receiving section 152 extending from opposing sides to the slit 156. The thick contoured bottom edge portion 158 preferably includes outer and inner lips or flanges 160 defining a channel 162 into which the edge surfaces of the enclosure wall are received to provide a sealed interface.

Preferably the edge grommet is mechanically securable to the enclosure front wall. Front wall 36 includes a plurality of upstanding wall sections 50,52 of limited width between the cable-receiving recesses 48 and also beside the outer recesses, which are receivable into close fitting apertures 164 through the thick contoured edge 158 of edge grommet 150. Latching projections 74 on upstanding wall sections 50,52 adjacent forward edge 46 of front wall 36, latchingly engage corresponding latching recesses 166 of edge grommet 150 at trailing or upper ends of the close fitting apertures 164 after the edge grommet has been fully inserted onto front wall 36. This arrangement permits removal and replacement of an edge grommet if desired.

Referring especially to FIGS. 7 and 9, a thin diaphragm section 168 extends across most of the cable-receiving opening 48 which is traversed by a section 152 of edge grommet 150, vertically bisected by virtual slit 156. Diaphragm 168 is thick enough to retain sufficient stiffness to grip against the insulative outer jacket of a service cable extending therethrough slid into slit 156 from upper surface 154 of edge grommet 150. Preferably diaphragm 168 is defined by several pairs of small horizontal strip sections 170 having ends 172 along virtual slit 156 and which are initially joined to vertically adjacent others thereof at frangible sections 174, which upon insertion of a service cable into slit 156 become controllably torn, permitting forward or rearward deflection of ends 172 of strips 170. Ends 172 remain biased against the insulative outer jacket of a service cable by the resilience of the elastomeric material. Upper ones of strips 170 located above a service cable pushed downwardly therepast will resile and substantially close the opening above the service cable, with ends 172 of the horizontally adjacent strips 170 returning to their adjacent state at virtual slit 156. The upper entrance of each section 152 is defined by stiff opposed pointed structures 176 along upper surface 154 which meet at virtual slit 156. Stiff opposed structures 176 are shown to be joined initially to uppermost ones of strip sections 170 by frangible sections in similar fashion to frangible sections between vertically adjacent strip 170. Structures 176 permit a service cable to be urged therethrough from above but close completely after the cable has been urged into the region of diaphragm 168.

The edge grommet and sealing system of the present invention can also be used for a single cable-receiving recess, with the grommet having a single cable-receiving recess, with the wall of the enclosure preferably having a pair of limited-width wall sections beside the recess to extend upwardly through corresponding apertures through the thick bottom and top edge portions of the grommet. The edge grommet of the present invention can also be mounted or affixed to the wall of the enclosure by adhesive rather than by use of the latching system described herein. Also the diaphragm need not be a constant thickness but could be of increasing thickness extending from the virtual slit to the thick side portions.

Still other variations may occur to those skilled in the art, which are within the spirit of the invention and the scope of the claims.

What is claimed is:

1. A grommet for sealing at least one entrance to an enclosure through each of which is received a length of cable, each of the entrances being a recess along an edge of a panel of the enclosure, comprising:

an integral member molder of elastomeric material and having thick top and bottom edge portions and including cable-receiving sections associated with each of said recesses along said edge of a said panel of said enclosure, each said cable-receiving section coextending from said top edge portion to said bottom edge portion and including a virtual alit extending through and downwardly from said top edge portion and concluding at said bottom edge portion; and thick portions beside each said cable-receiving section between said top and bottom edge portions, each said cable-receiving section comprising a pair of opposed stiff deflectable portions along said top edge portion adjacent said virtual slit therebetween, and a diaphragm section downwardly from and adjacent said opposed stiff deflectable portions and joined only initially to said stiff deflectable portions by a frangible section therebetween, said diaphragm section defined by at least a first pair of opposed resilient stripe extending from respective thickened portions to free ends adjacent said virtual alit therebetween, all so that a cable portion is insertable into a respective said cable-receiving section from said top edge portion by being urged along said virtual slit deflecting apart and moving past said stiff deflectable portions and at least deflecting apart adjacent ends of a first paid pair of said opposed resilient strips, with at least said stiff deflectable portions closing together after said cable portion is moved therepast, thereby closing off any opening between said cable portion and said top edge portion while a said pair of opposed resilient strips is biased against said cable portion to minimize any opening adjacent said cable portion;

wherein each said thickened portion includes an aperture from a bottom edge of said grommet to and through said top edge portion for receipt therethrough of a corresponding wall section of said panel of said enclosure beside each of said cable-receiving recesses; and wherein at least one said thickened portion includes a latching recess proximate said top edge portion and in communication with a said aperture for latching engagement with a corresponding latching projection along said corresponding wall section of said panel upon assembly of said grommet to said panel edge.

2. A grommet as set forth in claim 1 wherein said diaphragm includes at least a second pair of opposed resilient strips adjacent to and downwardly from said first pair, and said first and second pairs of resilient strips are initially joined by a frangible section therebetween.

3. A grommet for sealing entrances to an enclosure through which are received lengths of cables, the entrances being recesses spaced along an edge of a panel of the enclosure, comprising;

an integral member molded of elastomeric material and having thick top and bottom edge portions and including cable-receiving sections associated with said recesses spaced along said edge of a said panel of said enclosure, said cable-receiving sections coextending from said top edge portion to said bottom edge portion and including a virtual slit extending through and downwardly from said top edge portion and concluding at said bottom edge portion; and thick portions between respective adjacent ones of said cable-receiving sections and beside outermost ones thereof between said top and bottom edge portions, each said cable-receiving section comprising a pair of opposed stiff deflectable portions along said top edge portion adjacent said virtual slit therebetween, and a diaphragm section downwardly from and adjacent said opposed stiff deflectable portions and joined only initially to said stiff deflectable portions by a frangible section therebetween, said diaphragm section defined by at least a first pair of opposed resilient strips extending from respective thickened portions to free ends adjacent said virtual slit therebetween, all so that a cable portion is insertable into a respective said cable-receiving section from said top edge portion by being urged along said virtual slit deflecting apart and moving past said stiff deflectable portions and at least deflecting apart adjacent ends of a first said pair of said opposed resilient strips, with at least said stiff deflectable portions closing together after said cable portion is move therepast, thereby closing off any opening between said cable portion and said top edge portion while a said pair of opposed resilient strips is biased against said cable portion to minimize any opening adjacent said cable portion;

wherein each said thickened portion includes an aperture from a bottom edge of said grommet to and through said top edge portion for receipt therethrough of a corresponding wall section of said panel of said enclosure between adjacent ones or beside outermost ones of said cable-receiving recesses; and wherein at least one said thickened portion includes a latching recess proximate said top edge portion and in communication with a said aperture for latching engagement with a corresponding latching projection along said corresponding wall section of said panel upon assembly of said grommet to said panel edge.

4. A grommet as set forth in claim 3 wherein said diaphragm includes at least a second pair of opposed resilient strips adjacent to and downwardly from said first pair, and said first and second pairs of resilient strips are initially joined by a frangible section therebetween.

5. A system for sealing about at least one cable portion extending into an enclosure, comprising:

at least one cable-receiving recess along and extending inwardly from an edge of a panel of an enclosure, said panel including wall sections beside each said cable-receiving recess extending to ends along said edge, and an elastomeric member molded of elastomeric material and having thick top and bottom edge portions and including cable-receiving sections associated with said at least one cable-receiving recess, each said cable-receiving section coextending from said top edge portion to said bottom edge portion and including a virtual slit extending through and downwardly from said top edge portion and concluding at said bottom edge portion, and thick portions beside each said cable-receiving section between said top and- bottom edge portions, each said cable-receiving section comprising a pair of opposed stiff deflectable portions along said top edge portion adjacent said virtual slit therebetween, and a diaphragm section traversing a respective said cable-receiving recess of said panel and extending downwardly from and adjacent said opposed stiff deflectable portions and joined only initially to said stiff deflectable portions by a frangible section therebetween, said diaphragm section defined by at least a first pair of opposed resilient strips extending from respective thickened portions to free ends adjacent said virtual slit therebetween, whereby a cable portion is insertable into a respective said cable-receiving recess and associated said cable-receiving section from said top edge portion by being urged along said virtual slit deflecting apart and moving past said stiff deflectable portions and at least deflecting apart adjacent ends of a first said pair of said opposed resilient strips, with at least said stiff deflectable portions closing together after said cable portion is moved therepast, thereby closing off any opening between said cable portion and said top edge portion while a said pair of opposed resilient strips is biased against said cable portion to minimize any opening adjacent said cable portion;

wherein each said thickened portion includes an aperture from a bottom edge of said grommet to and through said top edge portion for receipt therethrough of a corresponding wall section of said panel of said enclosure; and wherein said free end of at least one said wall section of said panel includes a latching projection thereon, and a corresponding said thickened portion includes a latching recess proximate said top edge portion and in communication with said latching projection upon assembly of said grommet to said panel edge.

6. A system as set forth in claim 5 wherein said diaphragm includes at least a second pair of opposed resilient strips adjacent to and downwardly from said first pair, and said first and second pairs of resilient strips are initially joined by a frangible section therebetween.

7. A system set forth in claim 5 wherein said panel edge includes a plurality of said cable-receiving recesses spaced therealong and said grommet includes a corresponding plurality of cable-receiving sections therealong, at least two said wall sections each include a said latching projection, and corresponding said apertures each include a said latching recess.

8. A system set forth in claim 5 wherein said panel edge includes a plurality of said cable-receiving recesses spaced therealong and said grommet includes a corresponding plurality of cable-receiving sections therealong.

9. A system as set forth in claim 5 wherein said thick bottom edge portion includes opposed flanges continuously therealong defining an edge-receiving recess therebetween whereby upon assembly of said grommet to said panel said edge is received into said edge-receiving recess between said opposed flanges.

* * * * *